Oct. 6, 1959  J. J. DUFFY  2,907,232
AUTOMATIC TRANSMISSION CONTROLS
Filed Aug. 13, 1958  2 Sheets-Sheet 1

JAMES J. DUFFY
INVENTOR.

BY Edwin C. McRae
John R. Faulkner
Donald J. Harrington
ATTORNEYS

JAMES J. DUFFY
INVENTOR.

United States Patent Office 2,907,232
Patented Oct. 6, 1959

2,907,232

AUTOMATIC TRANSMISSION CONTROLS

James J. Duffy, Detroit, Mich., assignor to Ford Motor Company, Dearborn, Mich., a corporation of Delaware Application August 13, 1958, Serial No. 754,745

6 Claims. (Cl. 74—732)

My invention relates generally to a power transmission mechanism and more particularly to an automatic control system for controlling the operation of fluid pressure operated servos which form a part of the transmission mechanism.

The power transmission mechanism to which the improvement of my invention may be applied may be used in a power train for an automotive type vehicle for transferring torque from the vehicle engine to the vehicle traction wheels. The transmission includes cooperating gear elements, and clutch and brake members may be provided for controlling the relative motion of the gear elements and for providing a driving torque reaction. The above mentioned servos are used for the purpose of energizing the clutch and brake elements and the servos in turn may be pressurized by means of a fluid pressure source and interconnecting conduits.

I contemplate that the fluid pressure source may comprise two positive displacement pumps, one pump being drivably connected to a vehicle engine and the other being drivably connected to a driven portion of the mechanism, such as the transmission tailshaft.

The gear elements of the transmission may be conditioned by the servos for either forward or reverse torque delivery, and during reverse operation the tailshaft driven pump is operated in a reverse direction while the engine driven pump is continuously driven in a forward direction during both reverse and forward drive operation.

A pressure regulator valve mechanism is provided in the control system on the discharge side of the pumps and a pair of check valves is situated in the structure for establishing or interrupting communication between the regulator valve mechanism and either one or the other pump.

The mode of operation of the check valve is determined by the relative pressure ratio of the pumps. During normal forward driving operation the engine driven pump functions as the sole source of control pressure and the check valves are appropriately positioned to permit the regulator valve mechanism to functionally cooperate with the engine driven pump and to establish a control pressure in the system. At higher operating speeds and when the transmission is conditioned for direct drive operation, the discharge pressure for the tailshaft driven pump may be of a sufficient magnitude to cause the check valves to establish communcation between the tailshaft driven pump and the regulator valve whereby the tailshaft driven pump functions as the sole pressure source, the regulator valve being adapted to exhaust the engine driven pump under these conditions.

The inlet side of each of the pumps communicates with a common sump and during forward drive operation each pump draws fluid from the sump under atmospheric pressure and pressurizes the same as above described. However, during reverse drive operation the tailshaft is driven in a reverse direction and it thus tends to feed fluid from the circuit into the sump while the engine driven pump functions as the sole pressure source. Since various exhaust ports are provided in the circuit, there is a tendency during reverse drive operation for the tailshaft driven pump to draw air from the control circuit and to discharge the same to the sump thereby creating an undesirable aerated condition of the oil in the sump. The aerated oil will be drawn into the inlet side of the engine driven pump and this causes the engine driven pump to lose capacity, the operating control pressure level thereby being decreased. This loss in control pressure in turn reduces the capacity of the transmission servos and results in slippage of the transmission clutch and brake components. This condition causes erratic reverse drive performance. Also, until the system is purged of aerated oil following operation in reverse, subsequent operation in the forward drive range is also erratic. Such a condition cannot be tolerated in an automotive type automatic transmission.

I have successfully overcome this problem by providinging an improved valve arrangement which cooperates with the two pumps in such a way that the tailshaft driven pump is continuously supplied with fluid regardless of the direction of rotation of the tailshaft thereby eliminating the tendency to pump air into the sump.

The provision of an improved control system for a power transmission mechanism of the type above described being a principal object of my invention, it is a further object of my invention to provide a control system capable of establishing forward and reverse torque delivery paths wherein the system includes a dual control pressure source and valve elements cooperating therewith for establishing a continuous fluid pressure distribution path to fluid pressure operated portions of the mechanism regardless of the relative pressure ratio of the pumps or the relative directions of rotation thereof.

It is a further object of my invention to provide a control system as above set forth wherein the pumps have a common fluid supply sump and wherein means are provided for preventing aeration of the sump when one of the pumps is operated in a reverse direction.

For the purpose of more particularly describing the principal features of my invention, reference may be made to the accompanying drawings in which:

Figure 3 is an enlarged view of a check valve which functionally cooperates with the dual pressure source, said pressure source and the cooperating valve forming a part of the control circuit of Figure 2.

Figure 1:
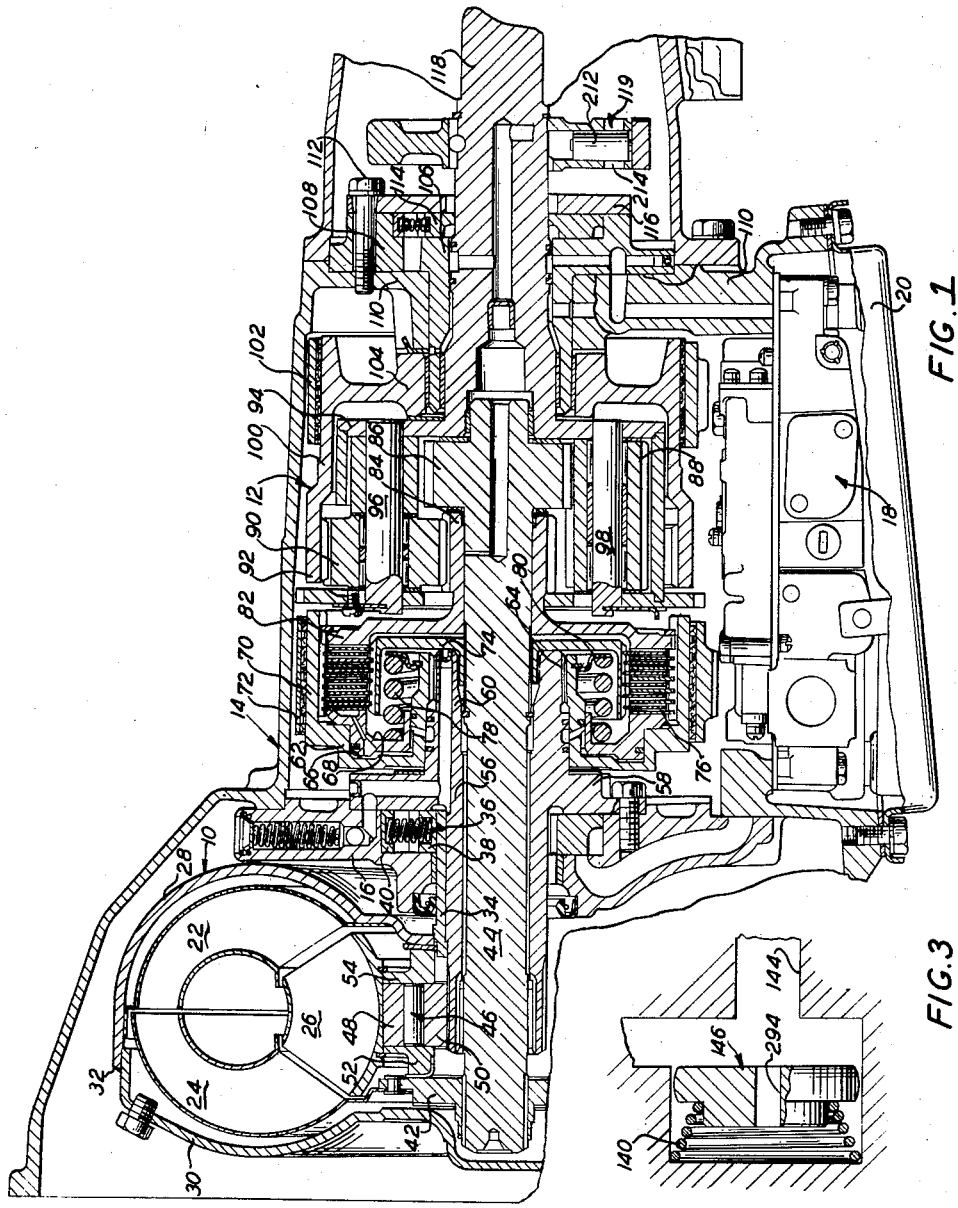
Figure 1 is a cross sectional assembly view of a multiple speed automatic power transmission mechanism capable of being used in the power train of an automotive type vehicle.

Referring first to Figure 1, the transmission mechanism comprises a hydrokinetic torque converter generally designated by numeral 10 and a compound planetary gear unit generally designated by numeral 12. The converter 10 and the gear unit 12 are situated in spaced portions of a common transmission casing 14, said casing portions being separated by a wall 16. The automatic control mechanism for the transmission is generally designated by the numeral 18 and it is situated in a lower region of the transmission assembly which defines a sump 20 containing a supply of fluid for the control mechanism 18.

The torque converter 10 comprises a pump member 22, a turbine member 24 and a reactor member 26, said converter members each comprising a plurality of fluid directing blades disposed in angularly spaced relationship about the geometric axis thereof. The blades for the respective converter members are joined by inner and outer shrouds which define a toroidal fluid flow path for accommodating a circulation of the work performing fluid. The pump member 22 includes a pump shell 28 secured to a drive plate 30 by means of a continuous peripheral weld 32. The drive plate 30 in turn may be connected to the crankshaft of the vehicle engine, not shown.

The inner periphery of pump shell 28 is secured to a supporting shaft 34 which extends axially into a cooperating opening formed in wall 16 of the transmission casing. A positive displacement pump is positioned within a suitable pump recess formed in wall 16 as indicated at 36. The pump illustrated in Figure 1 is of the slipper type although other forms of positive displacement pumps may be used, such as a gear pump having cooperating internal and external gears. The pump 36 includes a rotor 38 having peripheral slots within which slippers 40 are situated, said slippers forming the working elements of the pump mechanism as the rotor 38 is driven by the shaft 34. It is thus apparent that the pump 36 will be continuously driven by the vehicle engine in a direct and positive fashion during operation of the transmission mechanism.

The outer shroud for the turbine member 24 is positively connected to a hub member 42 which in turn is splined to an intermediate power delivery shaft 44.

The radially inward shroud for reactor member 26 is formed with a central opening within which is positioned an overrunning brake 46 having inner and outer races 48 and 50, respectively. Thrust elements 52 and 54 are disposed on either side of the overruning brake 46 as indicated. The inner race 50 of the overrunning clutch 46 is splined to a stationary reactor shaft 56 which is formed integrally with a stationary adaptor 58. Adaptor 58 in turn is secured to the wall 16 and forms a closure for the pump chamber of the pump 36. Wall 16 also includes an extension 60 which forms the bearing support for a clutch cylinder member 62, a suitable bushing 64 being provided for this purpose.

The member 62 defines an annular cylinder 66 within which is positioned a cooperating annular piston 68. The periphery of member 62 defines a brake drum 70 about which a brake band 72 is disposed.

A clutch member 74 is splined to shaft 44 and the periphery thereof is adapted to carry clutch discs as indicated, said clutch member 74 and the clutch discs being formed with cooperating internal splines in a conventional fashion. The interior portion of the brake drum 70 is internally splined and externally splined clutch discs cooperate therewith to partly define a multiple disc clutch assembly. The discs carried by clutch member 74 and the discs secured to drum 70 are situated in alternate relationship and the assembly defined thereby is identified by numeral 76.

The piston 68 is normally urged in a left-hand direction, as viewed in Figure 1, by a clutch return spring 78, said spring being seated on a spring seat element 80. The piston 68 and the cooperating cylinder define a working chamber and pressurized fluid may be admitted into this chamber through suitable internal passages to create a clutch energizing force.

A second clutch member 82 is positively connected to element 70 and it acts as a reaction element for the multiple disc clutch assembly 76.

The gear unit 12 comprises a pair of sun gears of differential diameter. The smaller of the sun gears is connected to clutch member 82 and is designated by numeral 84. The other sun gear, which is shown at 86, is formed on or joined to shaft 44 in adjacent relationship relative to sun gear 84. The gear unit 12 further includes compound planetary gears consisting of long planet pinions 88 and short planet pinions 90. The planet pinions 90 are drivably engaged with sun gear 84 and with a ring gear shown at 92 and the short planet pinions 88 engage sun gear 86. Planet pinions 88 and 90 are also in mesh with each other. Both the planet pinions 88 and 90 are carried by a common carrier assembly identified by numeral 94, the carrier assembly including pinion shafts 96 and 98 upon which pinions 92 and 90, respectively, are rotatably journaled.

The ring gear 92 forms a part of a brake member in the form of a drum 100 and a reaction brake band 102 is disposed about drum 100. As already indicated, suitable servos are provided for each of the brake bands 72 and 102 and these servos will subsequently be described.

The brake drum 100 includes a hub portion 104 journaled on an extension 106 which in turn forms a part of an adaptor 108. The transmission casing 14 includes an end wall 110 and the adaptor 108 may be secured thereto by suitable bolts 112.

The adaptor 108 is recessed to define a pump chamber for accommodating a pump mechanism 114 of the positive displacement type and a closure plate 116 is provided for enclosing the pump chamber. The pump mechanism 114 may be similar in form to the above described pump 36, and the driving element thereof is positively keyed or otherwise secured to the transmission tailshaft, which is identified in Figure 1 by numeral 118. The tailshaft 118 in turn extends to the rear of the transmission mechanism and is journaled within the extension 106. The carrier assembly 94 of the planetary gear unit 18 is positively connected to tailshaft 118 to form a power output connection. A governor valve assembly 120 is positively connected to tailshaft 118 in order to provide a tailshaft speed signal for control purposes, said valve 120 forming a portion of the automatic control circuit subsequently to be described.

The transmission mechanism illustrated in Figure 1 is capable of providing two forward driving speed ratios and a reverse driving ratio. To condition the transmission mechanism for a low speed driving ratio of maximum torque multiplication, the brake band 70 may be energized thereby anchoring sun gear 84, the clutch disc assembly 76 and brake band 102 being de-energized. The engine torque delivered to pump member 82 establishes a toroidal circulation in the converter and this results in an increased turbine torque which is transferred directly to sun gear 86 through the power delivery shaft 44. Sun gear 86 drives pinions 88 and the driving motion thereof is transferred to the transmission pinions 90. Since sun gear 84 is held stationary, the rotary motion of pinions 90 causes the carrier assembly 94 and the tailshaft 118 to rotate in a forward direction at a reduced speed ratio.

To obtain a second speed direct drive operation the brake band 72 is disengaged and the clutch disc assembly 76 is energized, the operation of the brake band 72 and the clutch disc assembly 76 being synchronized by the automatic control system in a fashion which will be subsequently described. After clutch disc assembly 76 is sufficiently energized, the sun gears 84 and 86 become locked together for joint movement. It is thus apparent that the elements of the planetary gear unit 12 will turn as a unit to establish a direct drive connection between turbine member 24 and tailshaft 118.

To obtain reverse drive, the brake band 72 and the clutch disc assembly 76 are both deenergized and the brake band 102 is energized. The ring gear 92 is therefore held stationary by brake band 102 and the turbine torque which is transferred to sun gear 86 tends to rotate pinions 88. The rotary motion of pinions 88 is transferred to pinions 90 and since the transmission sun gear 92 is held stationary, the pinions 90 tend to ride around ring gear 92 in a reverse direction, thereby providing a reverse driving torque to carrier assembly 94 and tailshaft 118.

Figure 2:
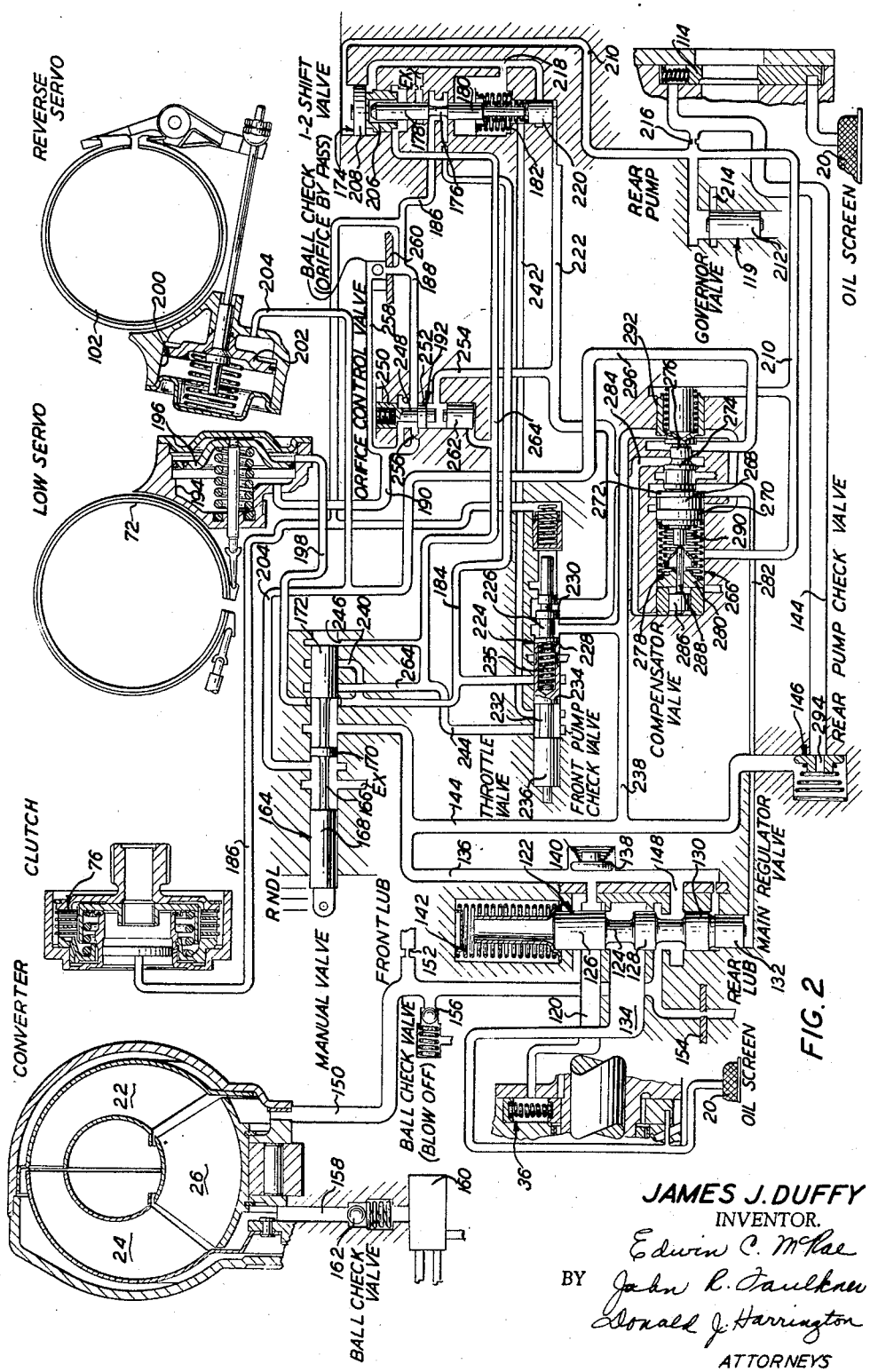
Figure 2 is a schematic diagram of an automatic control circuit capable of being used with the transmission mechanism of Figure 1 for obtaining automatic speed changes.

Referring next to Figure 2, the principal components of the automatic control circuit for the transmission mechanism of Figure 1 are identified by appropriate labels. The engine driven pump 36 is provided with a discharge passage 120 and the intake side of pump 36 communicates with the aforementioned sump 20. An oil screen may be provided around the oil intake passage for the pump 36 as indicated.

A main regulator valve is generally identified by numeral 122 and it comprises a multiple land valve spool 124 slidably situated within a cooperating valve opening, said valve spool 124 having spaced valve lands identified by numerals 126, 128, 130 and 132. The passage 120 communicates with the valve chamber of the regulator valve 122 and valve land 126 controls the degree of communication between passage 120 and an exhaust passage 134. Passage 120 also communicates with a control pressure passage 136 and a one-way check valve 138 is provided, as shown, for establishing direct fluid communication between passages 120 and 136. Check valve 138 is normally urged toward a closed position by a valve spring 140 as indicated.

The fluid pressure transferred to pressure passage 136 is redirected to the regulator valve chamber at a region between valve lands 128 and 130 and between valve lands 130 and 132. The diameter of valve land 132 is smaller than the adjacent valve land 130 and the control pressure in passage 136 is therefore effective to force the valve element 134 in an upward direction. This upwardly directed pressure force opposes and balances a downwardly directed spring force established by valve spring 142 which acts directly on the valve spool 124. It is thus apparent that the pressure established in passages 120 and 136 will be determined by the valve spring 142.

The discharge side of the tailshaft driven pump 114 communicates with control passage 136 through a passage 144. A one-way check valve generally designated by numeral 146 is situated in passage 144 and is adapted to accommodate the transfer of pressurized fluid from the pump 114 to passage 136 and to inhibit the transfer of pressurized fluid in the opposite direction. Valve 146 normally assumes a closed position under the influence of spring pressure.

Under those operating conditions in which the discharge pressure for the pump 36 is greater than the discharge pressure for pump mechanism 114, the one-way check valve 146 will be closed and one-way check valve 138 will be opened, and pressure regulation by the regulator valve 122 will be effected by valve land 126. However, under those driving conditions in which the discharge pressure for pump mechanism 114 is greater than the discharge pressure for pump 36, the check valve 138 will assume a closed position and check valve 146 will be opened. Communication is therefore established between passages 144 and 136, thereby permitting the pump mechanism 114 to supply the pressure requirements for the entire circuit. Under these conditions the control pressure in passage 136 is distributed to the regulator valve chamber in the region between valve lands 128 and 130, a suitable port 148 being provided for this purpose.

As soon as valve 138 closes, the valve spool 124 will be shifted in an upward direction so that valve land 128 will control the degree of communication between port 148 and the exhaust passage 134. Upon movement of the valve spool 124 to an upward position in this fashion, valve land 126 is shifted so that the discharge passage 120 is brought into direct communication with exhaust passage 134, thereby rendering the pump 36 inoperative. Since the pump 36 operates with a substantially zero pressure differential, a considerable saving in pumping horsepower is obtained.

It is contemplated that the pump mechanism 114 will be capable of supplying the total requirements of the circuit only at very high speeds during operation in the aforementioned direct drive ratio. However, the check valve 146 and the check valve 138 may both be opened during operation at an intermediate speed range so that the pump mechanism 114 will supplement the operation of the pump 36.

The hydrokinetic torque converter 10 is supplied with fluid by means of a converter supply passage 150 with the regulator valve chamber at a location adjacent valve land 128. Passage 150 is therefore brought into communication with passage 136 through port 138. Passage 150 also supplies the lubricating passages in the transmission mechanism as schematically shown at 152 and an orifice 154 is disposed between passage 150 and the exhaust region in order to maintain a desired back pressure in passage 150. The magnitude of the back pressure is controlled by a pressure relief valve 156.

A converter fluid return passage is shown at 158 and it communicates with an oil cooler 160 through a check valve mechanism 162.

Passage 136 extends to a manual valve generally shown at 164, said manual valve including a valve spool 166 having spaced valve lands 168, 170 and 172, the passage 136 communicating with the manual valve at a region between valve lands 170 and 172.

The manual valve 164 may be adjusted to any of several operating positions to select the various drive ranges, said drive ranges being identified by the symbols R, N, D and L which respectively correspond to reverse, neutral, drive and low. When the valve spool 166 assumes the position shown in Figure 2, the transmission will be conditioned for operation in drive range.

A shift valve is generally identified in Figure 2 by numeral 174 and it comprises a valve element 176 having spaced valve lands 178 and 180. Valve element 176 is disposed in a cooperating valve chamber and is urged in an upward direction, as seen in Figure 2, by a valve spring 182. A passage 184 extends from the manual valve chamber to an intermediate region of the shift valve chamber and when the manual valve is in the position shown, passage 184 is in communication with passage 186 so that the former is subjected to control pressure.

When the valve element 176 assumes the position shown in Figure 2, communication is established between the passage 184 and passage 186, the latter extending to the fluid pressure operated servo for the multiple disc clutch assembly 76. Passage 184 also communicates with a passage 188 which in turn communicates with a passage 190 through an orifice control valve generally identified in Figure 2 by numeral 192. The passage 190 in turn communicates with one side of a fluid pressure operated servo for the brake band 72. This servo comprises a cylinder 194 and a cooperating piston 196, said piston and cylinder cooperating to define a pair of opposed working chambers. The piston 196 is connected to the brake band 72 and is spring urged to a retracting position as indicated.

The aforementioned passage 190 communicates with the working chamber on the release side of the piston 196. The working chamber on the apply side of piston 196 communicates with a passage 198 which extends to the manual valve and which communicates with control pressure passage 186 through the manual valve. It is thus apparent that when both of the opposed working chambers of the brake servo defined by cylinder 194 and piston 196 are pressurized, the brake band 192 will be released. However, when the working chamber on the release side of the piston 196 is exhausted, the brake band 72 will be applied.

The brake band 102 is also energized by means of a fluid pressure operated servo which is defined by a cylinder 200 and a cooperating piston 202. The piston 202 is mechanically connected to the brake band and is normally urged toward a released position by a brake release spring as indicated. The piston 202 and the cylinder 200 define a working chamber which communicates with a passage 204 extending to the manual valve spool. When the manual valve spool 166 is in the position shown, passage 204 communicates with the manual valve chamber between valve lands 168 and 170 which in turn is exhausted through an associated exhaust port as indicated.

The shift valve 174 includes a portion 206 situated at the upper end of valve element 176 which includes a relatively large diameter valve land 208. The upper side of land 208 is subjected to a vehicle speed sensitive governor pressure which is supplied thereto by a communicating passage 210, said passage extending to the previously described governor valve mechanism generally designated by the numeral 119. As best seen in Figure 1, valve mechanism 119 comprises a valve element 212 situated in the previously described opening on one side of the axis of rotation of tailshaft 118. The opening in which valve element 212 is situated communicates with an exhaust port 214 and the valve element 212 is urged under the influence of centrifugal pressure to a radially outward position, thereby tending to close exhaust port 214. The opening for valve element 212 communicates with port 214 and the passage 210 extends thereto as indicated in Figure 2.

The passage 210 also communicates with passage 144 through a flow restricting orifice 216. The pressure in passage 210 exerts a radially inward force on valve element 212 which opposes and balances the centrifugal force acting in the opposite direction. It is apparent that communication between passage 210 and exhaust port 214 will be determined by the speed of rotation of the tailshaft, and the pressure in the passage 210 will be a function of the tailshaft speed. The orifice 216 establishes the desired amount of back pressure in passage 144 so that pump mechanism 114 may be utilized as a source of control pressure as previously described. This is important during reverse drive operation.

The governor pressure force acting on shift valve 174 is opposed by a modulated throttle pressure force which acts in an upward direction on valve land 180 and on a differential area formed on the lower side of land 208. Pressure is distributed to the region of the valve land 180 and land 208 through modulated throttle pressure passage 218.

A throttle pressure modulator valve element is shown at 220 and it is urged in a downward direction, as seen in Figure 2, by a valve spring which acts against the valve element 176. Throttle pressure is distributed to one side of the modulator valve element 220 through a modulated throttle pressure passage 222 and when the shift valve 176 assumes an upward position, the modulator valve element 220 is used to establish communication between passages 222 and 218 thereby creating a reduced or modulated throttle pressure in passage 218. It is this reduced throttle pressure which is utilized for determining the shift point.

The previously mentioned throttle pressure is passage 222 is produced by a throttle valve mechanism generally identified by numeral 224. This valve mechanism 224 comprises a valve spool 226 having spaced valve lands 228 and 230. Valve mechanism 224 further includes a downshift valve element 232 having spaced valve lands 234 and 236. A spring 235 is interposed between valve elements 232 and 236 so that when the former is adjusted, a valve actuating force will be transmitted to valve element 226. The movement of valve 232 is proportional to engine throttle movement and a mechanical connection between the engine throttle and valve element 232 may be provided for obtaining this adjustment.

Control pressure is distributed to the throttle valve mechanism by the lands 228 and 230 by means of a passage 238, and valve land 230 is adapted to control the degree of communication between passage 238 and the aforementioned throttle pressure passage 222. An annular working area is formed on one side of valve land 230 on which the pressure in passage 222 is caused to act. This creates a pressure force which opposes and balances the force supplied by valve spring 235. Movement of the engine throttle toward a wide open position will cause compression of spring 235 and this results in a high throttle pressure in throttle pressure passage 222.

It is thus apparent that the magnitude of the throttle pressure in passage 222 will be proportional to engine torque demand.

For the purpose of explaining the mode of operation of that portion of the control circuit thus far described, it will be assumed that the selector valve is positioned as shown in Figure 2 and that the vehicle is operated from a standing start. The governor pressure in passage 210 will be zero when the vehicle is stationary, and if the engine throttle is relaxed the throttle pressure in passage 222 is also substantially zero. Since the shift valve element 176 assumes an upward position, passage 186 is exhausted through the exhaust port associated with the shift valve 174 and the clutch servo and the working chamber on the release side of the brake servo piston 196 are both exhausted, the latter communicating with passage 190 through passages 186 and 188 as previously explained. The working chamber on the apply side of the piston chamber 196 is pressurized by means of passage 198 and therefore the low speed brake band 72 is applied.

If the operator then depresses the engine throttle, engine torque will be transmitted through the converter 10 and through the gear unit 12 in the manner previously described to provide an over-all driving ratio with maximum torque multiplication. Operation in the low speed driving ratio continues until the magnitude of the governor pressure in passage 210 is sufficient to cause the shift valve element 176 to move in a downward direction against the opposing force of valve spring 182 and the modulated throttle pressure force. The valve element 176 will then shift to the position shown in Figure 2 and the vehicle speed at which this shift occurs will be determined by the engine throttle setting.

After the valve element 176 assumes the position shown, communication is established between passages 184 and 186 thereby causing the servo for the clutch 76 to be energized and the pressure chamber on the release side of the brake servo piston 196 to be concurrently pressurized. Since the clutch assembly 76 becomes energized in sequence with engagement of brake band 22, the transmission is conditioned for direct drive operation.

If it is desired to operate the transmission in reverse, manual valve spool 166 can be shifted to the reverse position and passage 198 becomes exhausted through an exhaust port 240 which becomes uncovered by valve land 72. Control pressure passage 136 is brought into direct communication with passage 204 and the working chamber defined in part by numeral 202 of the reverse piston circuit is therefore pressurized to apply the reverse brake band 102. The clutch assembly 76 is de-energized since the passage 186 is exhausted through the exhaust port associated with shift valve 174, the valve element 176 assuming an upward position during reverse drive operation under the influence of the spring and modulated throttle pressure forces. Since the clutch assembly 76 and the brake band 72 are released while the brake band 102 is applied, the transmission is in condition for reverse drive operation as previously explained in the description of the transmission structure shown in Figure 1.

When the shift valve moves to the direct drive position as indicated in Figure 2 during a shift from low speed operation to normal drive operation, the valve element 176 causes the modulator valve element 220 to move in a downward direction and to block passage 218 while opening passage 242. Passage 242 extends to the throttle valve mechanism and it communicates therethrough with a passage 244 extending to an exhaust port 246 in the manual valve 164. It is thus apparent that the upwardly directed modulated throttle pressure forces which act on the shift valve element 176 prior to the shift to the direct drive position are terminated, and the shift valve 174 will therefore maintain a direct drive position until the governor pressure becomes sufficiently reduced in magnitude to permit the valve 172 to urge the valve 176 in an upward direction. The vehicle speed at which this shift to the upward or low speed position occurs will be substantially less than the vehicle speed at which a shift will occur from a low speed upward position to the direct drive downward position.

It is desirable to delay the application of the low speed brake band 72 during a downshift from direct drive to the low speed ratio under a zero throttle condition. This prevents an undesirable roughness when the brake band 72 is applied. This delay is accomplished by the previously mentioned orifice control valve 192 which comprises a valve spool 248 having spaced valve lands 250 and 252. Valve spool 248 is urged in a downward direction by a suitable valve spring. The valve spool 248 is slidably positioned in the valve chamber and the lower end thereof is subjected to throttle pressure by means of a passage 254. Whenever the engine is under torque, the throttle pressure is sufficient to maintain spool 248 in the position shown and then free communication is established through orifice control valve 192 between passages 188 and 190. However, under zero throttle conditions the throttle pressure becomes reduced to zero and the valve spool 248 is moved in a downward position under the influence of the associated valve spring. When this occurs, passage 188 communicates with passage 190 only through a by-pass orifice shown at 256. Whenever a downshift occurs under zero throttle conditions the pressurized fluid in the pressure chamber on the release side of the brake servo piston 196 must be exhausted through the orifice 256 and this delays the application of the brake band 272 relative to the time interval required to deenergize the clutch assembly 76.

It is not desirable to restrict the degree of communication between passages 188 and 190 during a light throttle upshift since this would cause an undesirable overlap between the engagement of the clutch assembly 76 and the disengagement of the brake band 72. During such a light throttle upshift the valve spool 248 would normally assume a downward position and would normally provide such a restriction. I have therefore provided a passage 258 which by-passes the orifice control valve 192 and which permits pressurized fluid to pass directly from passage 186 to passage 190 and into the working chamber on the release side of the brake servo piston 196. I have provided a one-way check valve as shown at 260 to accommodate this direct transfer of pressurized fluid to the brake servo. During the above described zero throttle downshift the check valve 260 is effective to inhibit a by-pass flow through passage 258 and the orifice 256 provides the only exhaust path for the fluid chamber in the release side of the brake servo piston 196.

It is undesirable to allow the orifice control valve 192 to restrict the fluid exhaust path for the low speed brake servo when the vehicle is traveling at relatively high speeds and when the manual valve is shifted to a low range position indicated by the symbol "L." I have therefore provided a piston element 262 in the lowermost portion of the valve chamber for the orifice control valve 192. The lower end of the piston element 262 is subjected to control pressure when the manual valve assumes the low range position and this control pressure is distributed to the orifice control valve through passage 264. It is thus apparent that whenever the manual valve is shifted to the low range position, the orifice control valve element 248 will be held in the upward position regardless of the engine throttle position or the magnitude of the engine throttle pressure. The brake band 72 may therefore be quickly applied as the clutch assembly 76 is disengaged. This prevents an undesirable slippage of the friction elements.

As previously indicated, the transmission may be conditioned for continuous operation in the low speed drive range by moving the manual valve to the low range position and this causes valve land 172 to uncover passage 264 so that the latter will communicate directly with control pressure passage 136 through the manual valve. Passage 264 also communicates with the lower end of a portion 206 of shift valve 174, thereby urging the same in an upward or low speed position. Control pressure is also distributed from passage 264 to passage 244 and through the throttle valve mechanism to passage 242. This causes control pressure to be distributed to the lower end of valve land 180 and to the working area on the lower side of land 208. This causes an additional pressure force which urges the shift valve 174 to a low speed position. Passage 186 is therefore brought into direct communication with the exhaust port associated with shift valve 174 and the clutch assembly 76 is exhausted directly into passage 186. Similarly, the working chamber on the release side of the brake piston 196 is exhausted through passages 190, 188 and 186, the orifice control valve 192 assuming an upward position under these conditions as previously explained.

In order to maintain a smooth shift pattern and to maintain the required torque capacity for the various clutch and brake servos, it is desirable to vary the magnitude of the control pressure in accord with the operating torque demands. For this reason a compensator valve mechanism has been included in the circuit, as indicated at 266. This mechanism comprises a multiple land valve element 268 which is positioned in a cooperating valve opening and which is formed with a plurality of opposed valve lands shown at 270, 272, 274 and 276. The valve element 268 is urged in a right-hand direction by compensator valve spring 278 which in turn is seated on a closure member 280. The region occupied by the spring 278 is subjected to governor pressure by means of passage 210 which communicates therewith. Control pressure is distributed to the compensator valve chamber at a point intermediate valve lands 270 and 272, the valve land 272 supplying controlled communication between passage 278 and a compensator pressure passage 282. Throttle pressure is conducted to the right side of valve element 268 through a passage 284 and it acts on an annular differential area between valve lands 274 and 276. Throttle pressure is also conducted to the left side of the compensator valve assembly and it acts upon the end of a valve piston element 286. A force transfer member 288 is movably mounted in closure member 280 and is adapted to engage valve piston element 286. The force transfer member 288 is urged in a left-hand direction by an inner valve spring 290 which is seated at one end thereof on a spring seat element that contacts the member 288. The other end of spring 290 acts on valve element 268.

It is thus seen that the governor pressure force and the force of spring 278 acting in a right-hand direction on the compensator valve element 268 will be balanced and opposed by the throttle pressure force acting in a left-hand direction on valve land 274. This leftward throttle pressure force is supplemented by the force of the compensator pressure in passage 282 which acts on the right side of land 272. The compensator valve element 268 therefore acts as a pressure regulator and the compensator pressure which is produced in passage 282 will be a function of both governor pressure and throttle pressure. The compensator pressure is transferred to the lower end of valve land 132 on the regulator valve spool 124 and urges the same in an upward direction. After throttle pressure is increased in response to an increased engine torque demand for any given vehicle speed, the compensator valve element 268 will be urged in a leftward direction to decrease the degree of communication between passages 238 and 282. This results in a decreased compensator pressure and the valve land 126 on the regulator valve spool 124 will therefore provide an increased degree of communication between passages 120 and 134.

This results in an increased control pressure which is sufficient to increase the torque transmitting capacity of the clutch and brake servos to accommodate the increased torque which normally accompanies an increased engine throttle setting. On the other hand, after the vehicle speed increases for any given engine throttle setting, the net force acting on the valve element 268 in a right-hand direction is increased thereby increasing the degree of communication between passages 288 and 232. This increases the compensator pressure and this in turn increases the degree of communication between passages 121 and 134. This results in a decreased control pressure which is made available to the transmission clutch and brake servos and this decrease may be made to correspond to the inverse relationship between vehicle speed and engine torque.

The engine torque for any given vehicle speed is generally proportional to engine throttle setting during movement of the engine throttle from a zero throttle position to a throttle setting which is approximately 60 percent of the wide open throttle position. After this intermediate throttle setting is obtained, it is not desirable to allow the compensator pressure to become decreased since further throttle movement beyond this setting will not ordinarily correspond to an increased engine torque. A throttle pressure cut-out feature is therefore provided in the compensator valve mechanism. This cut-out feature is obtained by means of the above described valve piston element 286 and its associated spring 290. That is, when the engine throttle reaches an intermediate setting or approximately wide open position, the throttle pressure will be of a sufficient magnitude to cause the valve piston element 286 to compress spring 290 and to cause the force transfer member 288 to engage compensator valve element 268. Upon a further increase in engine throttle setting, the increase in the throttle pressure force resulting from the corresponding increased throttle pressure will be transferred directly to the compensator valve spool and will oppose and balance the increased throttle pressure force acting in the left-hand direction on multiple land valve spool element 268. The compensator valve mechanism will therefore be rendered insensitive to changes in engine throttle setting beyond the limiting intermediate position.

A governor pressure cut-out feature is also incorporated in the compensator valve mechanism and this is provided by a valve piston element 292 situated on the right-hand side of compensator valve element 268. The element 292 is movably positioned in a cooperating valve chamber and is adapted to engage the end of the valve element 268. Governor pressure is caused to act on the right side of element 292 and the left side of element 292 is subjected to control pressure by means of passage 238 which communicates with the associated valve chamber at this point.

It is desirable to allow the control pressure to decrease as the vehicle speed increases beyond a predetermined value for any given engine throttle setting since the torque capacity of the clutch and brake servos would be insufficient to accommodate the necessary driving torque. The element 292 is therefore calibrated so that when a predetermined limiting vehicle speed is reached for any given throttle setting, the element 292 will be biased against the opposing forces into engagement with valve element 268. Further increases in vehicle speed will cause an increased governor pressure but the resulting increased governor pressure force acting on the left side of the valve element 268 will be opposed and balanced by an equal force acting on the element 292. The compensator valve mechanism is therefore rendered insensitive to changes in the vehicle speed after a predetermined speed is obtained for any given throttle setting.

It is necessary to increase the control pressure in the circuit during operation of the transmission in reverse since the torque requirements of the reverse brake servo are relatively high. For this reason control pressure is transferred to the right side of valve land 276 of the compensator valve element 268 by means of passage 294. The passage 294 communicates with passage 204 so that it is pressurized whenever the transmission is conditioned for reverse drive operation. The pressure force acting on valve land 276 will supplement the valve forces acting in a left-hand direction of multiple land valve element 268 and will cause a decrease in the compensator pressure passage 282. This in turn will result in an increase in control pressure as previously explained.

When the transmisison is conditioned in this fashion for reverse drive operation, the pump mechanism 114 will be driven in reverse direction and the passage 144 will therefore tend to become a pressure supply passage rather than a pressure discharge passage. The front pump 36 continues to be driven in a forward direction and it will form the sole pressure source during reverse drive. The check valve 146 will therefore become closed and the check valve 138 will be opened. The pump mechanism 114 will therefore tend to discharge fluid from the control circuit into the transmission pump and since the circuit includes a plurality of exhaust ports, there exists a tendency to draw air under atmospheric pressure into passage 144 and to distribute the same into the sump. In order to reduce this tendency to pump air, I have provided a precalibrated orifice in check valve 146 as shown at 294. Orifice 294 is adapted to provide a controlled degree of communication between passage 136 and the pump mechanism 114 and the pump 114 therefore discharges fluid into the sump rather than air. This prevents aeration of the sump and the oil which is drawn by the pump 36 from the sump will not be contaminated with air bubbles and the regulator valve 122 will therefore maintain a uniform control pressure in the circuit. The required torque for the reverse brake servo is therefore maintained. In addition, erratic and unpredictable operation of the control system during subsequent forward drive operation is eliminated.

Having thus described a preferred form of my invention, what I claim and desire to secure by United States Letters Patent is:

1. In an automatic power transmission mechanism having gear elements capable of delivering torque from a driving member to a driven member; a control system including fluid pressure operated servo means for selectively conditioning said transmission gear elements for forward torque delivery and for reverse torque delivery, a first fluid pressure pump drivably connected to said driving member, a second fluid pressure pump drivably connected to said driven member, conduit structure including separate portions extending from each pump to a common portion, said common portion communicating with said servo means, and check valve means located in each separate portion of said conduit structure for blocking the separate portion of said conduit structure for one pump when the discharge pressure for the other pump exceeds the discharge pressure for said one pump and for blocking the separate portion of said conduit structure for the other pump when the discharge pressure for said one pump exceeds the discharge pressure for said other pump, both pumps communicating with a common sump, said check valve means including a calibrated orifice for permitting a restricted fluid flow to said second fluid pressure pump from high pressure portions of said conduit structure when said driven member is driven in a reverse direction relative to said driving member.

2. In an automatic power transmission mechanism having gear elements capable of delivering torque from a driving member to a driven member; a control system including fluid pressure operated servo means for selectively conditioning said transmission gear elements for forward torque delivery and for reverse torque delivery, a first fluid pressure pump drivably connected to said driving member, a second fluid pressure pump drivably connected to said driven member, conduit structure including separate portions extending from the discharge side of each pump to a common portion, a regulator valve mechanism having two pressure regulating portions, one regulating portion communicating with the separate portion of said conduit structure for said first pump and the other regulating portion communicating with the separate portion of said conduit structure for the second pump, and separate valve means located in each separate portion of said conduit structure for blocking the discharge side of said one pump when the discharge pressure for the other pump exceeds the discharge pressure for said one pump and for blocking the discharge side of said other pump when the discharge pressure for said one pump exceeds the discharge pressure for said other pump, the intake side of each pump communicating with a common sump, said check valve means including a calibrated orifice for permitting a restricted fluid flow to said second pump from high pressure portions of said conduit structure when said driven member is driven in a reverse direction relative to said driving member.

3. In an automatic control circuit, a fluid pressure operated servo, a pair of fluid pressure pumps, conduit structure interconnecting the discharge side of each pump and said servo, each pump being adapted to deliver fluid pressure to said servo upon rotation thereof in a forward direction and each pump communicating with a common sump, a check valve means disposed in said conduit structure for accommodating the distribution of pressurized fluid from one of said pumps through said conduit structure when said one pump is driven in a forward direction and for inhibiting a reverse flow of fluid to said one pump when said one pump is driven in a reverse direction, and an orifice forming a by-pass passage around said check valve means, said orifice permitting a restricted flow of fluid to said one pump during reverse operation thereof thereby preventing aeration of said sump.

4. In an automatic power transmission mechanism having gear elements capable of delivering torque from a driving member to a driven member; a control system including fluid pressure operated servo means for selectively conditioning said transmission gear elements for forward torque delivery and for reverse torque delivery, a first fluid pressure pump drivably connected to said driving member, a second fluid pressure pump drivably connected to said driven member, conduit structure including separate portions extending from each pump to a common portion, said common portion communicating with said servo means, and check valve means located in each separate portion of said conduit structure for blocking the separate portion of said conduit structure for one pump when the discharge pressure for the other pump exceeds the discharge pressure for said one pump and for blocking the separate portion of said conduit structure for the other pump when the discharge pressure for said one pump exceeds the discharge pressure for said other pump, both pumps communicating with a common sump, said check valve means including a movable valve element and spring means for urging said valve element to a blocking position, and a continuously open precalibrated orifice formed in said valve element for permitting a restricted fluid flow to said second fluid pump from high pressure portions of said conduit structure when said driven member is driven in a reverse direction.

5. The combination as set forth in claim 2 wherein the check valve means for said second pump includes a movable valve element and wherein said precalibrated orifice is formed in said valve element to form a continuously open by-pass passage to accommodate a restricted fluid flow to said second pump from high pressure portions of said conduit structure when said driven member is driven in a reverse direction.

6. The combination as set forth in claim 3 wherein said check valve means includes a movable valve element and a valve spring, said spring being adapted to urged said valve element toward a conduit structure restricting position, and wherein said orifice is formed in said valve element thereby providing a continuously open flow restricting passage.

No references cited.